US011155748B2

(12) United States Patent
Cao et al.

(10) Patent No.: US 11,155,748 B2
(45) Date of Patent: Oct. 26, 2021

(54) STAR POLYMERS AND METHODS OF USE FOR DOWNHOLE FLUIDS

(71) Applicant: Baker Hughes Oilfield Operations LLC, Houston, TX (US)

(72) Inventors: Wen Shao Cao, Houston, TX (US); Grant Mackenzie, Montgomery, TX (US); Dennis Clapper, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 16/601,282

(22) Filed: Oct. 14, 2019

(65) Prior Publication Data

US 2021/0108128 A1    Apr. 15, 2021

(51) Int. Cl.
| | |
|---|---|
| *C09K 8/588* | (2006.01) |
| *E21B 43/22* | (2006.01) |
| *C09K 8/26* | (2006.01) |
| *C09K 8/34* | (2006.01) |
| *C09K 8/584* | (2006.01) |

(52) U.S. Cl.
CPC ............... *C09K 8/588* (2013.01); *C09K 8/26* (2013.01); *C09K 8/34* (2013.01); *C09K 8/584* (2013.01)

(58) Field of Classification Search
CPC .................................. C09K 8/588; C09K 8/34
USPC ...................................................... 166/270.1
See application file for complete search history.

(56) References Cited

U.S. PATENT DOCUMENTS

| | | | | |
|---|---|---|---|---|
| 6,150,468 A | * | 11/2000 | Schoenberg | C08F 2/24 525/222 |
| 8,813,845 B2 | * | 8/2014 | Ezell | C09K 8/035 166/305.1 |
| 9,315,621 B2 | * | 4/2016 | Chen | C08G 65/08 |
| 2006/0128598 A1 | * | 6/2006 | Chen | C09K 8/88 510/490 |
| 2014/0131039 A1 | * | 5/2014 | Reichenbach-Klinke | C09K 8/584 166/270.1 |
| 2014/0349894 A1 | * | 11/2014 | Quintero | C09K 8/32 507/110 |

(Continued)

FOREIGN PATENT DOCUMENTS

WO     2011004163 A1     1/2011

OTHER PUBLICATIONS

Li, Wen Wen, et al., "PEO-Based Star Copolymers as Stabilizers for Water-in-Oil or Oil-in-Water Emulsions", Macromolecules, Nov. 2012, 9419-9426.

(Continued)

*Primary Examiner* — Zakiya W Bates
*Assistant Examiner* — Ashish K Varma
(74) *Attorney, Agent, or Firm* — Mossman, Kumar & Tyler, P.C.

(57) ABSTRACT

An effective amount of amphiphilic star polymers and surfactants may be applied to downhole fluids containing oil-in-water and water-in-oil emulsions, such as drilling fluids, completion fluids, drill-in fluids, workover fluids, and remediation fluids, to stabilize the emulsions and improve rheological properties of these fluids for use in oil and gas production operations. The star polymers and surfactants may be applied to the downhole fluid separately or as a blend to generate emulsions within the fluid that have substantially uniform droplet size.

18 Claims, 8 Drawing Sheets

Star polymer with sorbitol core with polyethylene oxide ("PEO") and PEO/polymerized hydroxystearic acid arms ("HSA")

Star polymer with divinylbenzene core with PEO arms

(56) References Cited

U.S. PATENT DOCUMENTS

| | | | |
|---|---|---|---|
| 2016/0003018 A1* | 1/2016 | Saboowala | C09K 8/68 |
| | | | 166/298 |
| 2016/0304646 A1* | 10/2016 | Hsu | C09K 8/882 |
| 2018/0072832 A1* | 3/2018 | Huang | C08L 33/02 |
| 2018/0127531 A1* | 5/2018 | McCarthy | C09K 8/887 |

OTHER PUBLICATIONS

Teng, Jing, et al., "Synthesis and Self-Assembly of a Heteroarm Star Amphiphile with 12 Alternating Arms and a Well-Defined Core", J. Am. Chem. Soc., Jun. 2003, 11840-11841.

Genson, Kirsten L., et al., "Interfacial Micellar Structures from Novel Amphiphilic Star Polymers", Langmuir, Aug. 2004, 9044-9052.

* cited by examiner

Star polymer with sorbitol core with polyethylene oxide ("PEO") and PEO/polymerized hydroxystearic acid arms ("HSA")

Star polymer with divinylbenzene core with PEO arms

Star polymer with divinylbenzene core and alternating PEO/polybutylacetate arms

Star polymer with biphenyl hexahydrobenzene core with alternating polystyrene ("PS") and polyacrylic acid ("PAA") arms TSI measurements for calcium chloride brine with OWR 60/40

TSI measurements for calcium chloride brine with OWR 50/50

Droplets of OWR 60/40 calcium chloride brine with Conventional Emulsifier 1

Droplets of OWR 60/40 calcium chloride brine with IS 55

Droplets of OWR 60/40 calcium chloride brine with Conventional Emulsifier 1

Droplets of OWR 60/40 calcium chloride brine with IS 55

TSI measurements for HyCal II with OWR 70/30

TSI measurements for HyCal II with OWR 60/40

TSI measurements for HyCal II with OWR 50/50

Image of emulsion droplet structure in Emulsion C

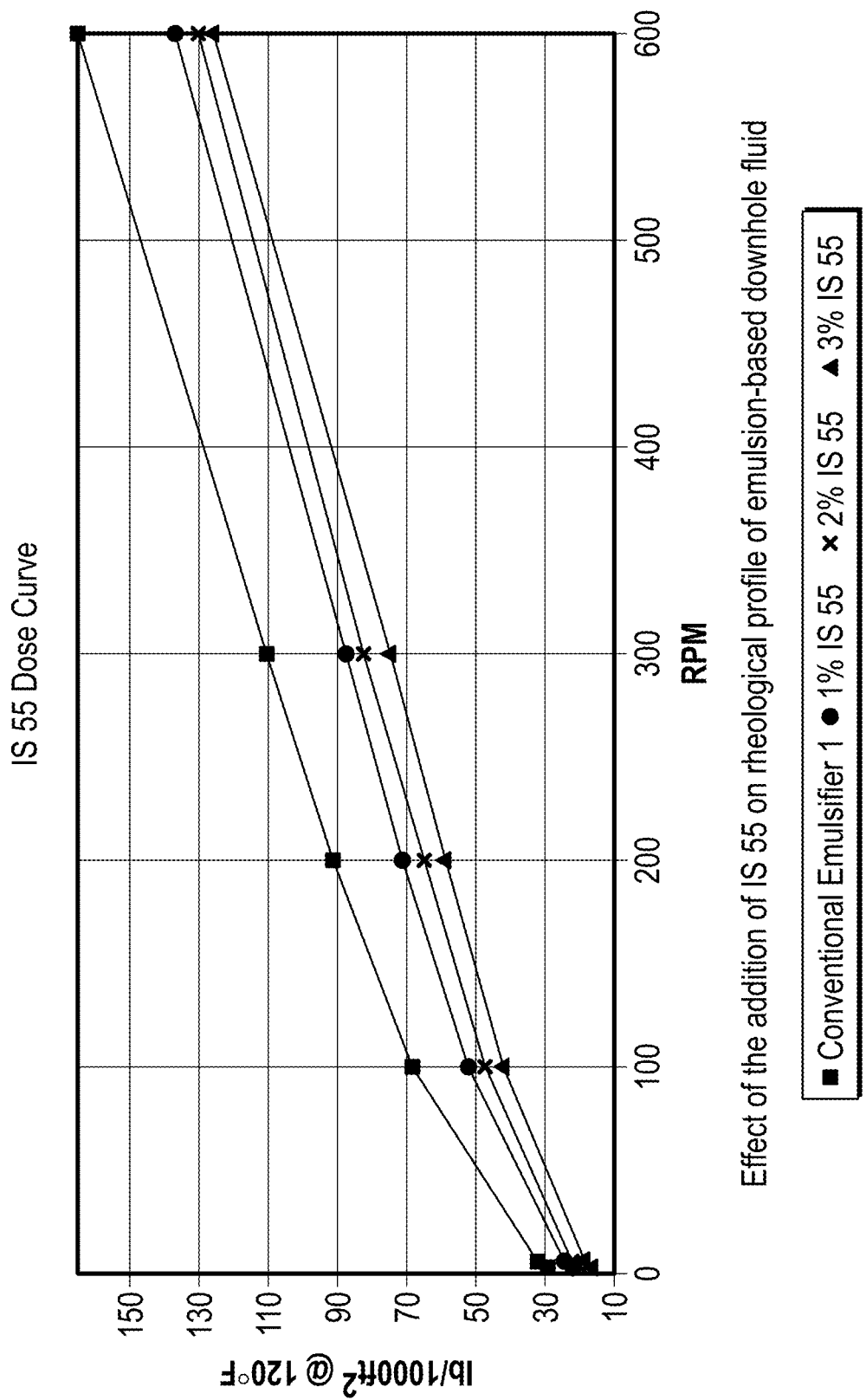

STAR POLYMERS AND METHODS OF USE FOR DOWNHOLE FLUIDS

TECHNICAL FIELD

The present invention relates to improving the properties of fluids used in the drilling, completion, servicing, and remediation of wells for oil and gas production from subterranean reservoirs (i.e. downhole fluids), and more particularly relates, in one non-limiting embodiment, to emulsion-based downhole fluids which contain star polymers of type effective to improve the properties thereof.

BACKGROUND

Downhole fluids, such as drilling fluids, drill-in fluids, completion fluids, workover fluids, and remediation fluids, used in the production of oil and gas from subterranean reservoirs are often complex emulsion-based fluids. Oil-in-water ("O/W") emulsion fluids are widely used for low pressure and depleted oil and gas reservoirs, while water-in-oil ("W/O") invert emulsion fluids may be useful in drilling, drill-in, completion, and workover of subterranean wells.

Because successful completion of an oil and gas well and production of hydrocarbons from an oil and gas reservoir is largely dependent upon these emulsion-based fluids, the task of making sure these downhole fluids have stable properties has gained significant interest in modern drilling and well completion operations.

In the case of emulsion-based drilling fluids, it is important to stabilize the emulsions in the fluids to confer better and more consistent rheological properties during use. Common problems for conventional invert drilling fluids, for example, include phase separation, oil breakout, and weighting agent sag, which lead to lack of control of rheological properties and less efficient drilling performance. Improved emulsion stability can make the fluid more resistant to phase separation, reduced weighting agent sag, and improve control of rheological properties for better drilling performance.

Surfactants or combinations of co-surfactants are often used in conventional emulsion drilling fluids to stabilize them. However, the structure of these conventional emulsifiers is limiting and do not necessarily lend themselves to creating emulsions with uniform droplet size, which may be helpful in optimizing the rheological properties of the emulsion-based fluid for more efficient, effective drilling and completion wellbores.

Therefore, it would be desirable to design emulsion-based downhole fluids with having low viscosity, high internal phase emulsions for improved downhole performance.

BRIEF DESCRIPTION OF DRAWINGS

FIG. 8 is graph displaying the effect of various amounts of star polymer of the kinds described herein and/or conventional emulsifier on the rheological profile of several downhole fluids.

SUMMARY

Figure 1A:
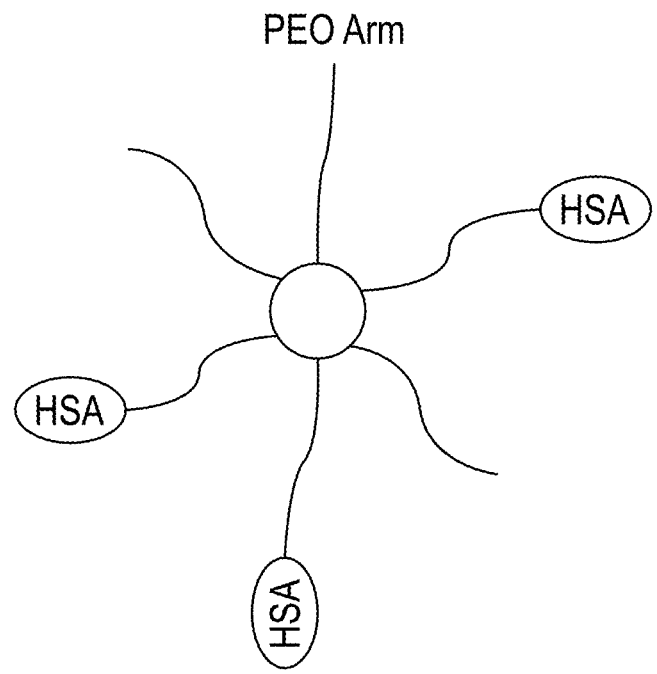
FIGS. 1A-1D are images showing the core-and-arm structure of some of the star polymers described herein.
Figure 1B:
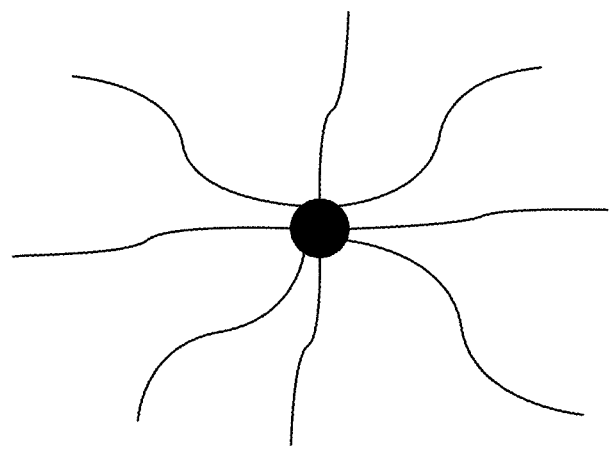
Figure 1C:
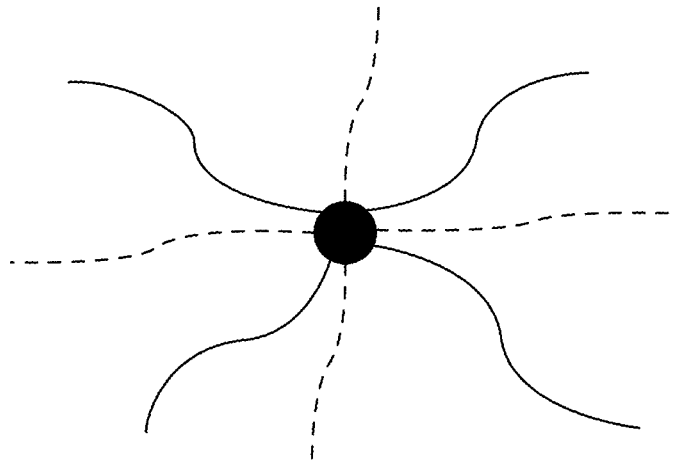
Figure 1D:
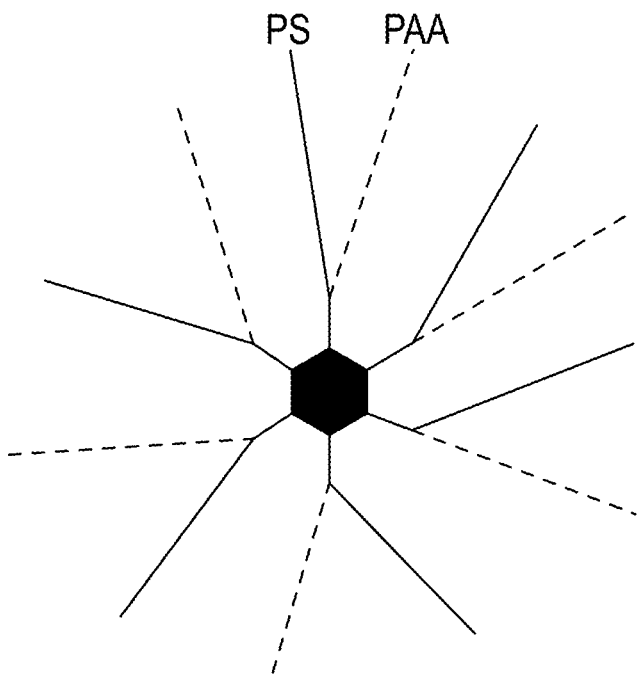

There is provided, in one non-limiting form, a method for stabilizing emulsions in a downhole fluid in which an amphiphilic star polymer and at least one surfactant are introduced, either separately or as a blend, into a downhole fluid containing emulsions in an amount effective to improve the stability of the emulsions in the downhole fluid.

There is also provided, in another form, a downhole fluid comprising: a at least one emulsion that is an oil-in-water emulsion and/or water-in-oil emulsion; an amphiphilic star polymer in an amount ranging from 0.1 pounds per barrel to about 20 pounds per barrel, based on a barrel of downhole fluid; and at least one surfactant in an amount ranging from about 8 pounds per barrel to about 15 pounds per barrel, based on a barrel downhole fluid.

In non-restrictive embodiment: the downhole fluid is a drilling fluid, a completion fluid, a drill-in fluid, a work over fluid, and/or a remediation fluid comprising oil-in-water, water-in-oil emulsions, or both; the amphiphilic star polymer is an amphiphilic star polymer with a sorbitol core and polyethylene oxide and/or polyethylene oxide/polymerized fatty acid arms, an amphiphilic star polymer with a polydivinylbenzene core and polyethylene oxide and/or polybutylacetate arms, or an amphiphilic star polymer with a biphenyl hexahydroxybenzene core and polystyrene arms and/or polyacrylic acid arms; and the at least one surfactant is a fatty acid, an oxidized fatty acid, a metal salt of a fatty acid, a metal salt of an oxidized fatty acid, a polyamidoamine, an imidazoline, an ethylene oxide/propylene oxide alkoxylate, an alkyl succinimide, and combinations thereof.

DETAILED DESCRIPTION

It has been discovered that the addition of amphiphilic star polymers along with surfactants to an emulsion-based downhole fluid is effective in enhancing the stability of the emulsions and thus improving the rheological properties of the downhole fluid for oil and gas production applications.

Amphiphilic star polymers are customizable compounds that have both hydrophilic and lipophilic regions contained within a general core-and-arm structure, as shown in the star polymer molecules in FIGS. 1A-1D. The hydrophobic and/or hydrophilic properties of the "arm" portion of the star polymer molecule may be manipulated through chemical reactions to generate molecules that have the ability to stabilize both oil-in-water ("O/W") and water-in-oil ("W/O") emulsions and help to generate emulsions with substantially uniform droplet size in a fluid. As defined herein, "substantially uniform droplet size" means emulsion droplets having substantially equal diameter size and volume. The use of such star polymers to increase emulsion stability in downhole fluids containing invert emulsions (i.e. W/O emulsions), in particular, can help to produce a downhole fluid with high internal phase emulsions, which, in turn, reduces the need for weighting agents, reduces viscosity of the downhole fluid, and makes the downhole fluid more resistant to phase separation; i.e. more stable.

Amphiphilic star polymers shown to be suitable for use in a downhole fluid to enhance emulsion stability include, but are not limited to, an amphiphilic star polymer with a sorbitol core and polyethylene oxide and/or polyethylene oxide/polymerized fatty acid arms, an amphiphilic star polymer with a polydivinylbenzene core and polyethylene oxide and/or polybutylacetate arms, and an amphiphilic star polymer with a biphenyl hexahydroxybenzene core and polystyrene arms and/or polyacrylic acid arms.

In one non-limiting embodiment, these star polymers are introduced to the downhole fluid in combination with one or more surfactants in amounts effective for producing a downhole fluid with improved stability and lower rheological properties. Surfactants that may be introduced with the amphiphilic star polymers of the kinds described herein to create a functional downhole fluid include, without limitation, a fatty acid, an oxidized fatty acid, a metal salt of a fatty acid, a metal salt of an oxidized fatty acid, a polyamidoamine, an imidazoline, an ethylene oxide/propylene oxide alkoxylate, an alkyl succinimide, and combinations thereof.

The amphiphilic star polymer(s) and at least one surfactant may be applied or introduced to the downhole fluid separately or as a blend. If introduced or added to the fluid in blend form, the amphiphilic star polymer(s) and surfactant(s) may be combined or blended within a carrier fluid. The carrier fluid may be one or more of the following: an olefin, diesel, mineral oil, a paraffin, an ester, and a glycol. In one non-limiting embodiment, the amount of amphiphilic star polymer in the blend ranges from about 1 wt. % to about 10 wt. %, the amount of the at least one surfactant in the blend ranges from about 60 wt. % to about 70 wt. %, and the amount of carrier fluid in the blend ranges from about 30 wt. % to about 40 wt. %. Alternatively, the amount of amphiphilic star polymer in the blend may range from about 1 wt. % to about 5 wt. %, the amount of at least one surfactant in the blend ranges from about 60 wt. % to about 65 wt. %, and the amount of carrier fluid in the blend ranges from about 30 wt. % to about 35 wt. %.

The amount of these components effective to improve emulsion stability and the rheological properties of the downhole fluid will vary depending on the ratios of oil-to-water or water-to-oil in the fluid and the temperature and pressure conditions. In one non-restrictive embodiment, the amount of amphiphilic star polymer effective to improve the stability of emulsions in a downhole fluid may range from about 0.1 pounds per barrel ("ppb") independently to about 20 ppb independently, based on a barrel of downhole fluid, or, from about 0.1 ppb to about 5 ppb independently; and the amount of at least one surfactant effective to improve stability of emulsions in a downhole fluid ranges from about 8 ppb independently to about 15 ppb independently based a barrel of downhole fluid or, from about 9 ppb independently to about 11 ppb independently. If these two components are applied as a blend, the amount of blended additive effective to improve stability of emulsions in a downhole fluid may range from about 5 ppb to about 15 ppb, or, from about 8 ppb independently to about 11 ppb independently.

The downhole fluids that may be improved by the addition of amphiphilic star polymers and surfactants of the kinds described herein are any emulsion-based fluid that may be used for readying a well for oil and gas production and servicing or remediating that well once the well is completed.

Downhole fluids are typically classified according to their base fluid. In water-based downhole fluids, oil and solid particles are suspended in a continuous phase consisting of potable water, brine, or seawater. Oil can be emulsified in the aqueous continuous phase meaning the fluid may contain O/W emulsions. Oil-based downhole fluids are the opposite or inverse of water-based downhole fluids. In oil-based downhole fluids, water and solid particles are suspended in a continuous phase consisting of oil. In oil-based downhole fluids, potable water, seawater, or brine can be emulsified in the oil—i.e. the downhole fluid comprises water-in-oil ("W/O") or invert emulsions. The oil in a water-based or oil-based downhole fluid may consist of any oil or water-immiscible fluid including, but is not limited to, diesel, mineral oil, paraffins, esters, refinery cuts and blends, or olefins. The oil phase may also be comprised of synthetically produced oils rather than those produced or refined from naturally-occurring materials. These often include, but are not necessarily limited to, olefin oligomers of ethylene, esters made from vegetable fatty acids and alcohols, ethers and polyethers made from alcohols and polyalcohols, glycols, paraffinic, or aromatic, hydrocarbons alkyl benzenes, terpenes and other natural products and mixtures of these types.

Non-limiting examples of oil-based and water-based downhole fluids containing emulsions include: a drilling fluid, a completion fluid, a drill-in fluid, a work over fluid, a remediation fluid, and combinations thereof.

The invention will now be illustrated with respect to certain examples which are not intended to limit the invention in any way but simply to further illustrate it in certain specific embodiments.

EXAMPLE 1

Samples of emulsion-based downhole fluids with different oil-to-water ratios containing conventional emulsifiers and samples of emulsion-based downhole fluids with different oil-to-water ratios containing a star polymer of kinds described herein were subjected to an emulsion stability study. In this study, a Turbiscan Lab was used to evaluate emulsion stability. Four separate samples of calcium chloride brine downhole fluid having a 60/40 or 50/50 oil-to-water ratio containing 6.5 ppb of a conventional emulsifier 1 (a crosslinked polyamidoamine), 6.5 ppb of a conventional emulsifier 2 (a different crosslinked polyamidoamine), 6.5 ppb of a conventional emulsifier 3 (a fatty acid imidazoline), and 6.5 ppb of IS 55, a star polymer of the type shown FIG. 1A, were prepared. The Turbiscan device measures the multiple light scattering of a sample and the TurbiSoft Lab program calculates the changes in light scattering over time. The TurbiSoft Lab program uses the data collected by the Turbiscan device to compute the Turbiscan Stability Index ("TSI"). The computation is directly based on the raw back scatter and transmission signals obtained with the instrument. It sums up all the variations in the sample and gives a unique number reflecting the destabilization of a given sample. Increasing TSI values indicate a decrease in emulsion stability. By comparing the TSI, one can compare different emulsions and identify the parameters that provide the best stability.

Figure 2:
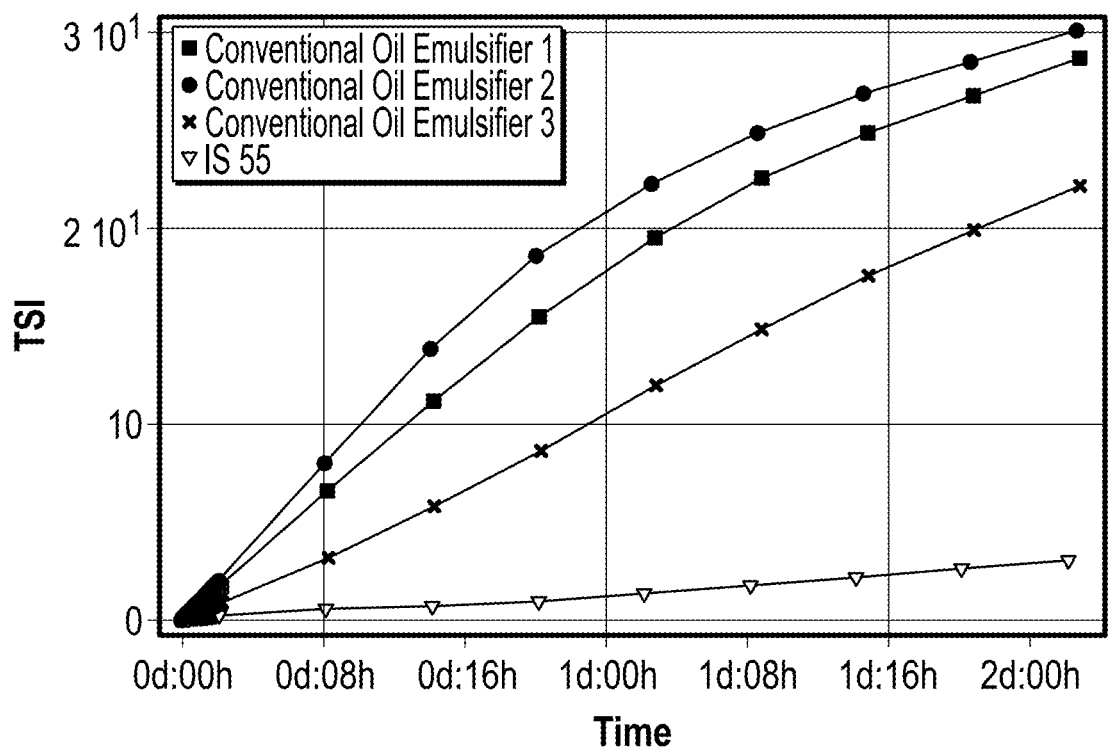
FIGS. 2 and 2A are graphs comparing emulsion stability of a calcium chloride brine downhole fluid having a 60/40 or 50/50 oil-to-water ratio, respectively, containing three separate conventional emulsifiers to the emulsion stability of a calcium chloride brine downhole fluid having a 60/40 or 50/50 oil-to-water ratio containing a star polymer of the kinds described herein.
Figure 2A:
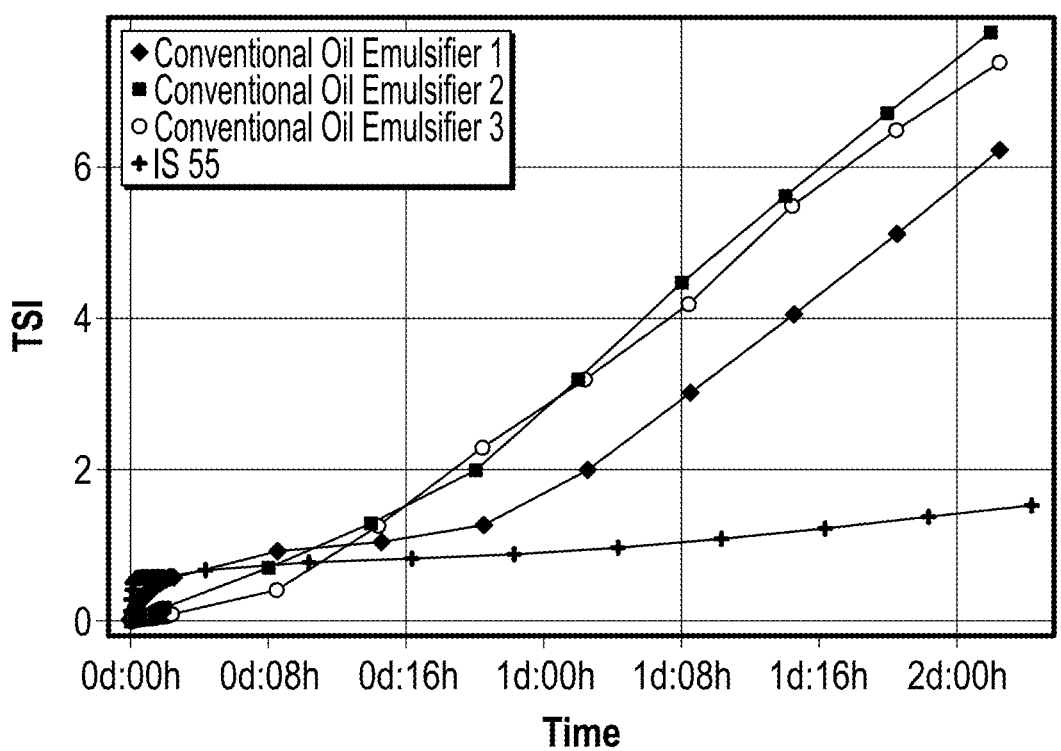
Figure 3A:
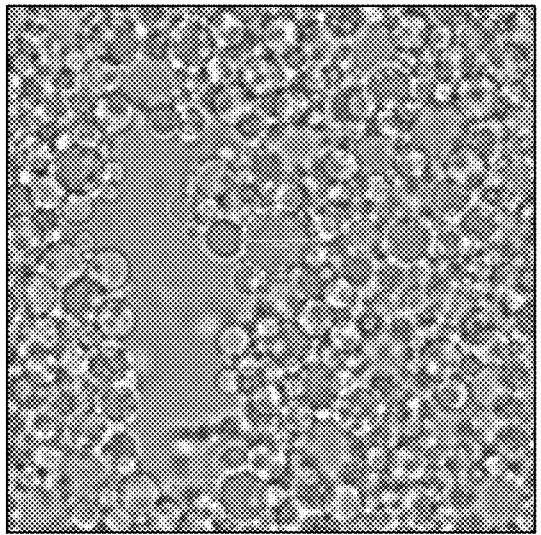
FIGS. 3A, 3B, 3C, and 3D are photographs comparing the emulsion droplet distribution/dispersion of a calcium chloride brine downhole fluid having a 60/40 oil-to-water ratio containing three separate conventional emulsifiers to the emulsion droplet distribution/dispersion of a calcium chloride brine downhole fluid having a 60/40 oil-to-water ratio containing a star polymer of the kinds described herein.
Figure 3B:
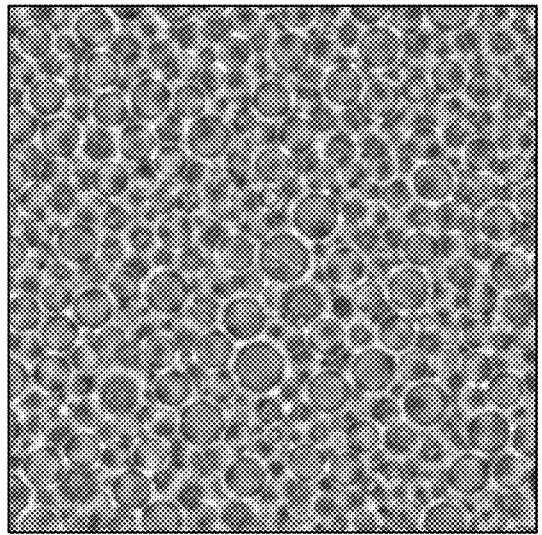
Figure 3C:
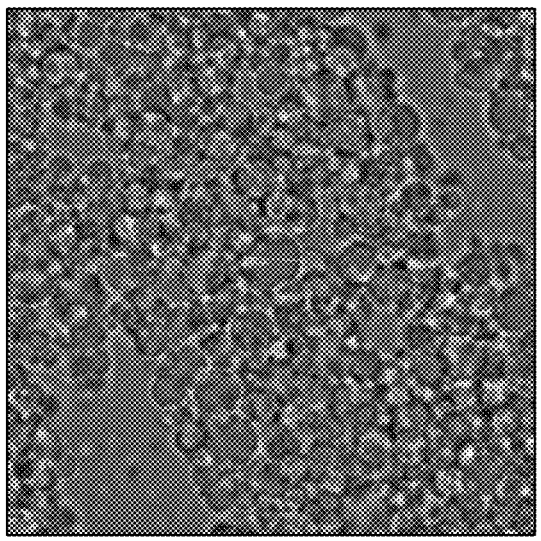
Figure 3D:
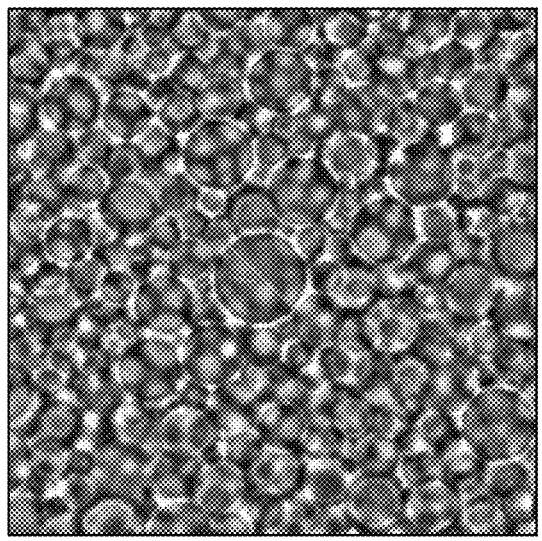

Based on the measurements collected for each sample, the graphs in FIGS. 2 and 2A show that the downhole fluid with the star polymer, IS 55, has a much slower destabilization rate over time in comparison with the samples of the downhole fluid with the conventional emulsifiers.

For the samples of calcium chloride brine having a 60/40 oil-to-water ratio, a confocal microscope was used to generate images of the each sample to compare the emulsion droplet distribution/dispersion of the calcium chloride brine downhole fluid having a 60/40 oil-to-water ratio containing three separate convention emulsifiers to the emulsion droplet distribution/dispersion of a calcium chloride brine downhole fluid having a 60/40 oil-to-water ratio containing a star polymer of the kinds described herein. As FIGS. 3A, 3B, 3C, and 3D show, the emulsion droplet distribution/dispersion of the calcium chloride brine downhole fluid having a 60/40 oil-to-water ratio containing three separate convention emulsifiers has significantly fewer emulsion droplets having the substantially same size and volume than the emulsion droplet distribution/dispersion of a calcium chloride brine downhole fluid having a 60/40 oil-to-water ratio containing a star polymer of the kinds described herein, indicating that the samples of downhole fluid treated with the star polymer are more stable.

Figure 4:
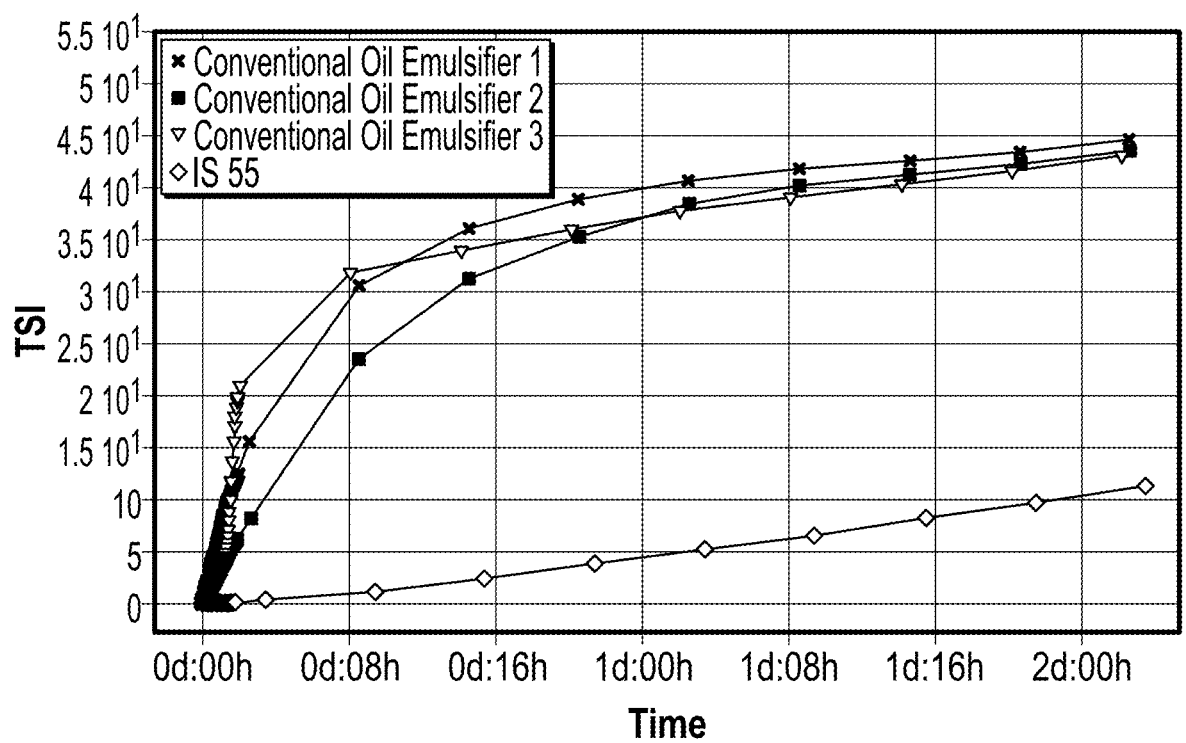
FIG. 4 is a graph comparing emulsion stability of a calcium chloride/calcium bromide brine downhole fluid having a 70/30 oil-to-water ratio containing three separate conventional emulsifiers to the emulsion stability of a calcium chloride/calcium bromide brine downhole fluid having a 70/30 oil-to-water ratio containing a star polymer of the kinds described herein.
Figure 5:
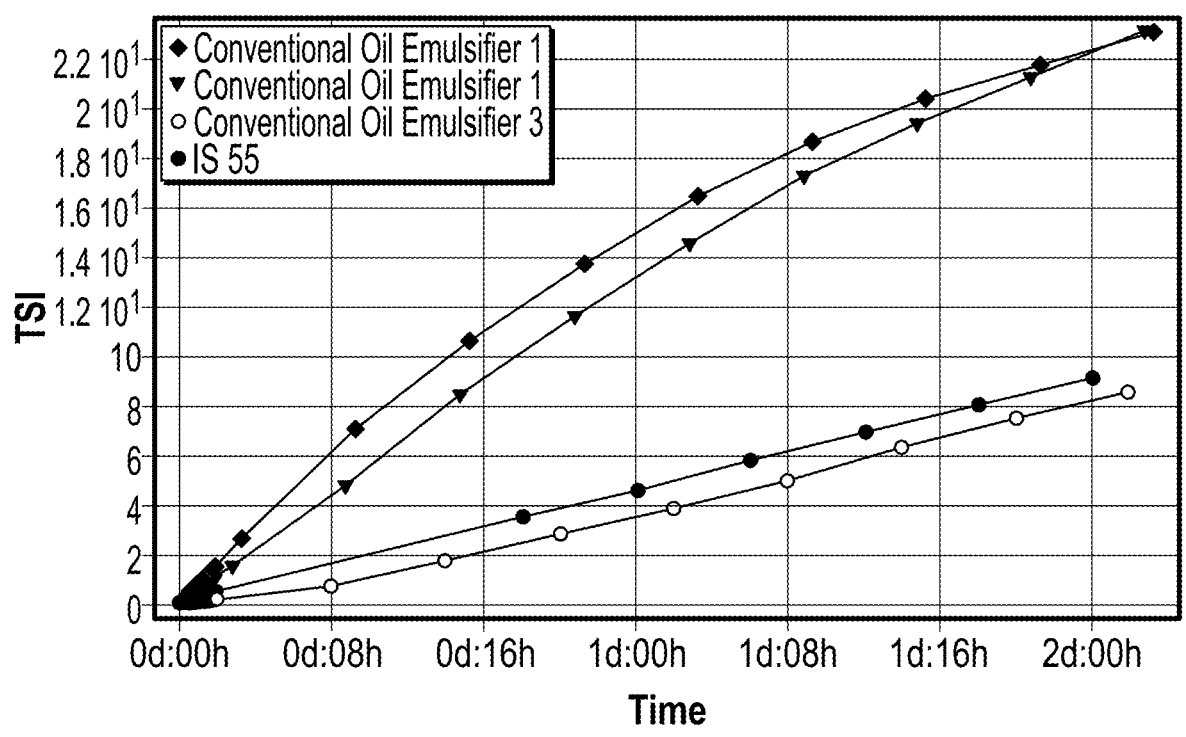
FIG. 5 is a graph comparing emulsion stability of a calcium chloride/calcium bromide brine downhole fluid having a 60/40 oil-to-water ratio containing three separate conventional emulsifiers to the emulsion stability of a calcium chloride/calcium bromide brine downhole fluid having a 60/40 oil-to-water ratio containing a star polymer of the kinds described herein.
Figure 6:
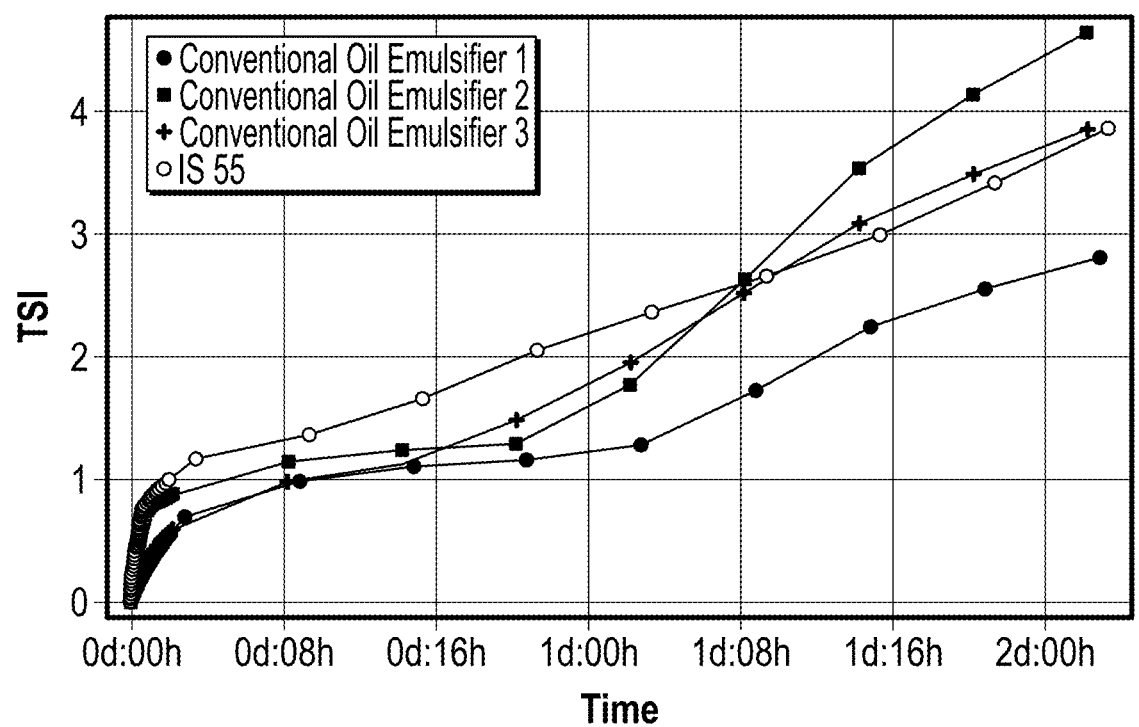
FIG. 6 is a graph comparing emulsion stability of a calcium chloride/calcium bromide brine downhole fluid having a 50/50 oil-to-water ratio containing three separate conventional emulsifiers to the emulsion stability of a calcium chloride/calcium bromide brine downhole fluid having a 50/50 oil-to-water ratio containing a star polymer of the kinds described herein.

Using the same Turbiscan devices and programs, the emulsion stability of samples of a HyCal II calcium chloride/calcium bromide brine downhole fluid having a 70/30, 60/40, and 50/50 oil-to-water ratio treated with the same conventional emulsifiers and star polymer described above was also evaluated. FIGS. 4, 5, and 6 display the destabilization of the emulsions over time in each treated sample of the HyCal II downhole fluid. Following a trend similar to that for the calcium chloride fluids in FIGS. 2 and 2A, with the exception of the 50-50 HyCal II fluid samples, the star polymer emulsifier (IS 55) made downhole fluids with lower destabilization as compared to the conventional emulsifiers.

EXAMPLE 2

In separate series of tests with a viscometer, the rheological profiles of several treated downhole fluids were evaluated. Table 1 below shows the rheological data for samples of emulsion-based downhole fluids containing various concentrations of IS 55 and Conventional Emulsifier 1.

TABLE 1

IS 55 (Star Polymer) and Conventional Oil Emulsifier 1 Combination
Downhole Fluid Formulations and Related Rheological Data
IS 55 Effect on Emulsion Rheological Properties

| Product | Units | Emulsion A | Emulsion B | Emulsion C | Emulsion D | Emulsion E |
|---|---|---|---|---|---|---|
| Synthetic Base Oil | lb/lbb | 124.51 | 124.51 | 124.51 | 124.51 | 124.51 |
| 33% CaCl | lb/lbb | 245.26 | 245.26 | 245.26 | 245.26 | 245.26 |
| Conventional Oil Emulsifier 1 | lb/lbb | 7.02 | | 6.84 | 6.67 | 6.32 |
| IS55 | lb/lbb | | 7.02 | 0.18 | 0.35 | 0.70 |
| Emulsifier Ratio | | | | 97.5/2.5 | 95/5 | 90/10 |
| Mud Weight | lbm/gal | | | 8.96 | | |
| Oil Water Ratio | | | | 50/50 | | |
| Electrical Stability | Volt | 211 | 270 | 315 | 315 | 314 |
| 600 rpm reading | lb/100 ft2 @70° F. | 96 | 97 | 80 | 69 | 65 |
| 300 rpm reading | lb/100 ft2 @70° F. | 65 | 52 | 44 | 37 | 35 |
| 200 rpm reading | lb/100 ft2 @70° F. | 53 | 35 | 31 | 26 | 25 |
| 100 rpm reading | lb/100 ft2 @70° F. | 28 | 18 | 16 | 13 | 13 |
| 6 rpm reading | lb/100 ft2 @70° F. | 15 | 1 | 1 | 1 | 1 |
| 3 rpm reading | lb/100 ft2 @70° F. | 13 | 1 | 1 | 1 | 0 |
| 10 Sec Gel | lb/100 ft2 @70° F. | 12 | 1 | 1 | 0 | 0 |
| 10 Min Gel | lb/100 ft2 @70° F. | 12 | 1 | 1 | 0 | 0 |
| Plastic Viscosity | cP @70° F. | 31 | 45 | 36 | 32 | 30 |

Figure 7:
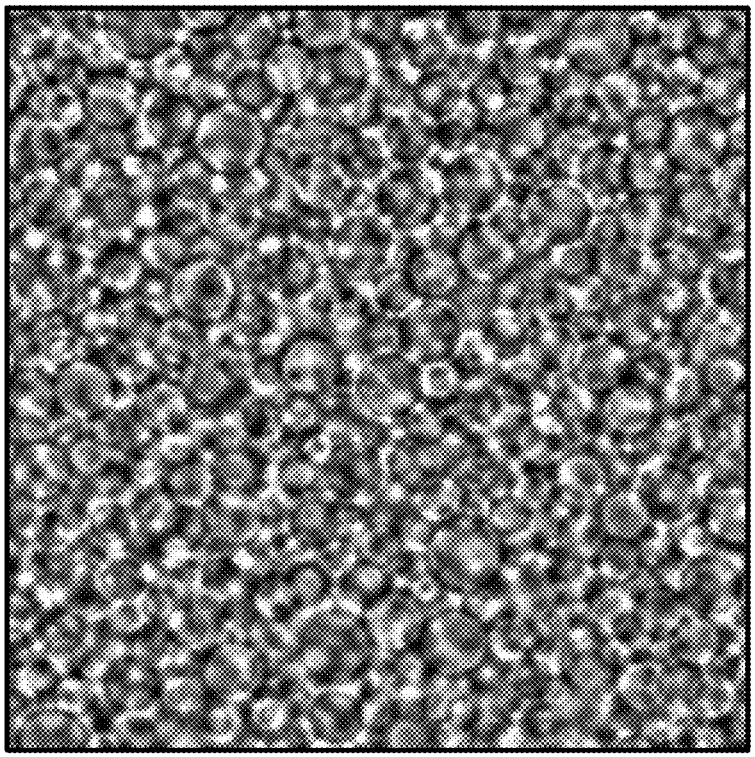
FIG. 7 is a photograph displaying the emulsion droplet structure in a downhole fluid treated with a star polymer of the kinds described herein and a conventional emulsifier.

The downhole fluids C, D, and E with the Star Polymer and Conventional Emulsifier 1 combination display lower rheological readings overall when compared to downhole fluids A and B, which are treated with the Star Polymer by itself or the Conventional Emulsifier 1 by itself. The rheological profile of the downhole fluid treated with a combination formulation containing a low level of star polymer and a higher loading of a conventional emulsifier is similar to results from previous testing of formulations with IS 55, which suggests that the emulsion droplets are in a dispersed state. This is verified in the image in FIG. 7 showing the droplet structure of Emulsion C.

Table 2 and FIG. 8 show data demonstrating the effect of various amounts of star polymer of the kinds described herein and/or conventional emulsifier on the rheological profile of several emulsion-based downhole fluids.

TABLE 2

Rheological Profile of Several Emulsion-Based Downhole Fluid Formulations with Varying Doses of IS 55 Star Polymer and/or Conventional Emulsifier 1
IS 55 Effect on Fluid Rheological Properties
12 ppg 50/50 OWR

| Product | Units | Fluid A | Fluid B | Fluid D | Fluid E | Fluid F |
|---|---|---|---|---|---|---|
| Synthetic Base Oil | lb/lbb | 106.23 | 106.23 | 106.23 | 106.23 | 106.23 |
| 25% CaCl2 Brine | lb/lbb | 196.54 | 196.54 | 196.54 | 196.54 | 196.54 |
| LIME | lb/lbb | 2.00 | 2.00 | 2.00 | 2.00 | 2.00 |
| IS 55 | lb/lbb | — | 10.50 | 0.11 | 0.22 | 0.32 |
| Organophilic Clay | lb/lbb | 2.50 | 2.50 | 2.50 | 2.00 | 2.00 |
| Conventional Emulsifier 1 | lb/lbb | 10.50 | — | 10.39 | 10.28 | 10.18 |
| Barite | lb/lbb | 186.23 | 186.23 | 186.23 | 186.23 | 186.23 |
| Initial Properties | Units | | | 1.00% | 2.00% | 3.00% |
| 600 rpm reading | lb/100 ft2 @120° F. | 150 | 224 | 133 | 114 | 104 |
| 300 rpm reading | lb/100 ft2 @120° F. | 107 | 140 | 88 | 66 | 56 |
| 200 rpm reading | lb/100 ft2 @120° F. | 90 | 109 | 71 | 50 | 41 |
| 100 rpm reading | lb/100 ft2 @120° F. | 69 | 71 | 52 | 32 | 24 |
| 6 rpm reading | lb/100 ft2 @120° F. | 34 | 16 | 23 | 11 | 6 |
| 3 rpm reading | lb/100 ft2 @120° F. | 31 | 13 | 21 | 10 | 5 |
| Plastic Viscosity | cP @120° F. | 43 | 84 | 45 | 48 | 48 |
| Yield Point | lb/100 ft$^2$ @120° F. | 64 | 56 | 43 | 18 | 8 |
| 10 Sec Gel | lb/100 ft2 @120° F. | 31 | 10 | 20 | 11 | 7 |
| 10 Min Gel | lb/100 ft2 @120° F. | 32 | 10 | 19 | 15 | 9 |
| Electrical Stability | volts | 479 | 110 | 483 | 451 | 418 |
| Post Hot Roll | Units | 120 | 120 | 120 | 120 | 120 |
| Hot Roll Temp | 200° F. | 200 | 200 | 200 | 200 | 200 |
| 600 rpm reading | lb/100 ft2 @120° F. | 165 | 140 | 137 | 130 | 126 |
| 300 rpm reading | lb/100 ft2 @120° F. | 110 | 76 | 88 | 82 | 75 |
| 200 rpm reading | lb/100 ft2 @120° F. | 91 | 53 | 71 | 65 | 59 |
| 100 rpm reading | lb/100 ft2 @120° F. | 68 | 29 | 52 | 47 | 42 |
| 6 rpm reading | lb/100 ft2 @120° F. | 32 | 3 | 24 | 22 | 19 |
| 3 rpm reading | lb/100 ft2 @120° F. | 29 | 2 | 22 | 19 | 17 |
| Plastic Viscosity | cP @120° F. | 55 | 64 | 49 | 48 | 51 |
| Yield Point | lb/100 ft$^2$ @120° F. | 55 | 12 | 39 | 34 | 24 |
| 10 Sec Gel | lb/100 ft2 @120° F. | 28 | 2 | 20 | 19 | 17 |
| 10 Min Gel | lb/100 ft2 @120° F. | 27 | 3 | 22 | 19 | 17 |
| 30 Min Gel | lb/100 ft2 @120° F. | 27 | 3 | 21 | 18 | 17 |
| Electrical Stability | volts | 298 | 70 | 288 | 213 | 230 |
| HTHP@275° F. | mL | 2.4 | 28 | 3.2 | 3.2 | 3.2 |
| Water in Filtrate | mL | 0 | 12 | 0 | 0 | 0 |

As indicated by the data in Table 2, which is graphed in FIG. 8, the overall rheological properties of the fluids treated with some amount of IS 55 is lower than Fluid A, which contains no IS 55 Star Polymer. And, the addition of IS 55 did not completely disrupt the low-end rheological properties of the fluids.

In the foregoing specification, the invention has been described with reference to specific embodiments thereof, and has been described as effective in providing methods, additives, and treatments for formulating emulsion fluids for downhole applications. However, it will be evident that various modifications and changes can be made thereto without departing from the broader spirit or scope of the invention as set forth in the appended claims. Accordingly, the specification is to be regarded in an illustrative rather than a restrictive sense. For example, fluids, star polymers, surfactants, conventional additives, such as conventional emulsifiers, and the structure, composition, amounts, and proportions of the components falling within the claimed parameters, but not specifically identified in this disclosure or evaluated in a particular Example, are expected to be within the scope of this invention.

The present invention may suitably comprise, consist or consist essentially of the elements disclosed and may be practiced in the absence of an element not disclosed. For instance, the method or fluid may comprise, consist essentially of, or consist of the steps or components recited in the independent claims, respectively. Specifically, there may be provided a method for stabilizing emulsions in a downhole fluid, the method consisting essentially of or consisting of introducing an amphiphilic star polymer and at least one surfactant to a downhole fluid containing emulsions in an amount effective to improve the stability of the emulsions in the downhole fluid. Further there may be provided a downhole fluid consisting essentially of or consisting of at least one emulsion selected from the group consisting of oil-in-water emulsions and/or water-in-oil emulsions; an amphiphilic star polymer in an amount ranging from 0.1 pounds per barrel to about 20 pounds per barrel, based on a barrel of downhole fluid; and at least one surfactant in an amount ranging from about 8 pounds per barrel to about 15 pounds per barrel, based on a barrel of downhole fluid.

The words "comprising" and "comprises" as used throughout the claims, are to be interpreted to mean "including but not limited to" and "includes but not limited to", respectively.

As used herein, the singular forms "a," "an," and "the" are intended to include the plural forms as well, unless the context clearly indicates otherwise.

As used herein, the term "about" in reference to a given parameter is inclusive of the stated value and has the meaning dictated by the context (e.g., it includes the degree of error associated with measurement of the given parameter).

As used herein, the term "and/or" includes any and all combinations of one or more of the associated listed items.

As used herein, the term "substantially" means "to a great or significant extent" or "essentially."

What is claimed is:

1. A method for stabilizing at least one emulsion in a downhole fluid, the method comprising:
   introducing an amphiphilic star polymer and at least one surfactant to a downhole fluid containing emulsions in an amount effective to improve the stability of the at least one emulsion in the downhole fluid, where the amphiphilic star polymer has a core-and-arm structure with at least three arms and where the amphiphilic star polymer is selected from a group consisting of:
      an amphiphilic star polymer with a polydivinylbenzene core and polyethylene oxide and/or polybutylacetate arms, and
      an amphiphilic star polymer with a biphenyl hexahydroxybenzene core and polystyrene arms and/or polyacrylic acid arms; and
   improving the stability of the at least one emulsion.

2. The method of claim 1, wherein downhole fluid is selected from a group consisting of a drilling fluid, a completion fluid, a drill-in fluid, a workover fluid, a remediation fluid, and combinations thereof.

3. The method of claim 1, wherein the at least one emulsion contained within the downhole fluid is selected from a group consisting of oil-in-water emulsions, water-in-oil emulsions, and combinations thereof.

4. The method of claim 3, wherein subsequent to the introduction of the amphiphilic star polymer and the at least one surfactant, the downhole fluid comprises emulsion droplets having substantially uniform size.

5. The method of claim 1, wherein the at least one surfactant is selected from the group consisting of a fatty acid, an oxidized fatty acid, a metal salt of a fatty acid, a metal salt of an oxidized fatty acid, a polyamidoamine, an imidazoline, an ethylene oxide/propylene oxide alkoxylate, an alkyl succinimide, and combinations thereof.

6. The method of claim 1, wherein the downhole fluid containing at least one emulsion is a drilling fluid comprising water-in-oil emulsions.

7. The method of claim 1, wherein the effective amount of amphiphilic star polymer introduced to the downhole fluid ranges from about 0.1 pounds per barrel ("ppb") to about 20 ppb, based on a barrel of downhole fluid.

8. The method of claim 1, wherein the effective amount of the at least one surfactant introduced to the downhole fluid ranges from about 8 ppb to about 15 ppb, based on a barrel of downhole fluid.

9. The method of claim 1, wherein the amphiphilic star polymer and at least one surfactant are introduced to the downhole fluid as a blend.

10. The method of claim 9, wherein the blend further comprises a carrier fluid selected from a group consisting of an olefin, diesel, mineral oil, a paraffin, an ester, a glycol, and combinations thereof.

11. The method of claim 10, wherein the effective amount of amphiphilic star polymer in the blend ranges from about 1 wt. % to about 10 wt. %, the effective amount of at least one surfactant in the blend ranges from about 60 wt. % to about 70 wt. %, and the carrier fluid is present in the blend in an amount ranging from about 30 wt. % to about 40 wt. %.

12. The method of claim 9, wherein the effective amount of the blend introduced to the downhole fluid ranges from about 5 ppb to about 15 ppb, based on a barrel of downhole fluid.

13. The method of claim 1, wherein the downhole fluid comprises an oil-to-water ratio ranging from about 80/20 to about 20/80.

14. The method of claim 1, wherein the amount of amphiphilic star polymer introduced to the downhole fluid ranges from about 0.1 ppb to about 5 ppb, based on a barrel of downhole fluid.

15. The method of claim 1, wherein subsequent to the introduction of the amphiphilic star polymer and the at least one surfactant, the downhole fluid has a yield point of about 43 pounds per 100 ft$^2$ or less at 120° F.

16. The method of claim 1, wherein subsequent to the introduction of the amphiphilic star polymer and the at least one surfactant, the downhole fluid has a plastic viscosity of ranging from 30 centipoise to about 65 centipoise at 120° F.

17. A method for stabilizing at least one emulsion in a downhole fluid, the method comprising:
   introducing an amphiphilic star polymer and at least one surfactant to a downhole fluid containing emulsions in an amount effective to improve the stability of the at least one emulsion in the downhole fluid, where the amphiphilic star polymer has a core-and-arm structure with at least six arms and where the amphiphilic star polymer is selected from a group consisting of:
      an amphiphilic star polymer with a polydivinylbenzene core and polyethylene oxide and/or polybutylacetate arms, and
      an amphiphilic star polymer with a biphenyl hexahydroxybenzene core and polystyrene arms and/or polyacrylic acid arms; and
   improving the stability of the at least one emulsion.

18. The method of claim 17, wherein the effective amount of the at least one surfactant introduced to the downhole fluid ranges from about 8 ppb to about 15 ppb, based on a barrel of downhole fluid.

* * * * *